United States Patent
Drennen

(10) Patent No.: US 6,550,598 B2
(45) Date of Patent: Apr. 22, 2003

(54) ELECTRIC PARK BRAKE

(75) Inventor: David B. Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/895,276

(22) Filed: Jun. 29, 2001

(65) Prior Publication Data

US 2003/0000795 A1 Jan. 2, 2003

(51) Int. Cl.[7] ............................................. F16D 55/226
(52) U.S. Cl. ............... 192/219.4; 188/72.8; 188/106 F; 188/162
(58) Field of Search ...................... 192/219.4; 188/72.1, 188/72.6, 72.8, 106 F, 106 P, 156, 162

(56) References Cited

U.S. PATENT DOCUMENTS

| | | | |
|---|---|---|---|
| 4,793,447 A | * 12/1988 | Taig et al. ................. | 188/72.1 |
| 4,918,921 A | 4/1990 | Leigh-Mostevens et al. | |
| 5,148,894 A | * 9/1992 | Eddy, Jr. ................... | 188/72.6 |
| 5,348,123 A | * 9/1994 | Takahashi et al. ......... | 188/72.1 |
| 5,620,077 A | 4/1997 | Richard | |
| 5,667,284 A | 9/1997 | Drennen et al. | |
| 5,915,504 A | * 6/1999 | Doricht ..................... | 188/72.1 |
| 6,139,460 A | 10/2000 | Drennen et al. | |
| 6,311,808 B1 | * 11/2001 | Halasy-Wimmer et al. ...... | 188/72.6 |

* cited by examiner

*Primary Examiner*—Richard M. Lorence
(74) *Attorney, Agent, or Firm*—Scott A. McBain

(57) ABSTRACT

A brake apparatus for a vehicle includes a housing including a bore formed therein. A piston is slidably positioned in the bore, the piston and bore defining a fluid chamber therebetween. A screw member is operatively engaged with the piston. The piston and screw member are movable based on fluid pressure in the fluid chamber and movable in a linear direction based on the rotational movement of the screw member.

14 Claims, 2 Drawing Sheets

ELECTRIC PARK BRAKE

TECHNICAL FIELD

The present invention relates to automotive braking systems. More particularly, the brake assembly of the present invention includes a combined hydraulic service brake and electric park brake feature, which eliminates the need for a separate parking brake and associated structure.

BACKGROUND OF THE INVENTION

In conventional automotive braking systems the service brake and the parking/emergency brake are separate systems. The service brake is used for normal braking function during operation of the vehicle. The service brake typically includes a master cylinder that converts a manual exertion of force on a brake pedal into an increase of hydraulic pressure. The hydraulic pressure acts on a remote wheel cylinder or slave cylinder causing a brake pad to be applied to an associated rotor connected to a wheel of the vehicle, thus slowing the vehicle. Conventional park brakes are typically engaged when the vehicle operator pulls a lever or depresses a pedal connected to the park brake by a steel cable.

Hydraulic brakes are generally not used as parking brakes because hydraulic fluid under constant pressure has a tendency to leak past seals of a hydraulic brake system over time resulting in a decrease in fluid pressure, which would cause the brake to release its hold on the rotor. Therefore, this inadequacy of the hydraulic brake for use as a parking brake has required the existence of two separate braking systems to fulfill the needs of a vehicle operator.

It would be desirable to have a brake system that would improve on the existing brake system.

SUMMARY OF THE INVENTION

One aspect of the invention provides a brake apparatus including a housing including a bore formed therein. A piston is slidably positioned in the bore. The piston and bore define a fluid chamber therebetween. A screw member is operably engaged with the piston, wherein the piston and screw member are movable based on fluid pressure in the fluid chamber and wherein the piston is movable in a linear direction based on the rotational movement of the screw member.

Other aspects of the invention provide the brake apparatus with a driving member positioned in the bore and operatively engaged with the screw member. A motor may be operatively engaged with the driving member. A transmission may be operatively engaged with the driving member and a motor may be operatively connected to the transmission. The screw member may include a first helically shaped groove formed into an outer surface of the screw member and the piston may include a second helically shaped groove formed into an inner surface of the piston, the first and second grooves positioned to engage a plurality of rolling elements disposed therebetween. The screw member may include a first threaded portion on an outer surface thereof, and the piston includes a second threaded portion on an inner surface thereof, the first and second threaded portions being threadably engaged. The driving member may include an extending portion operatively connected to the screw member. The brake apparatus may include a first seal disposed between the housing and the driving member, a second seal disposed between the housing and the piston and a third seal disposed within the piston.

Another aspect of the invention may provide a first seal disposed between the housing and the driving member, a second seal disposed between the housing and the piston and a third seal disposed within the piston, wherein the screw member includes a first helically shaped groove formed into an outer surface of the screw member, and the piston includes a second helically shaped groove formed into an inner surface of the piston, the first and second grooves positioned to engage a plurality of rolling elements disposed therebetween, the driving member including a driving portion operatively connected to the screw member.

Another aspect of the present invention provides a method of applying an electric park brake for a hydraulic apply brake system including rotating a screw member engaged with a piston and linearly advancing the piston into contact with a brake pad responsive to the rotation of the screw member.

Another aspect of the method of the present invention includes activating a motor to rotate the screw member. The method may include activating a motor to engage a transmission and activating the transmission to rotate the screw member.

Another aspect of the present invention provides a brake apparatus including a means for rotating a screw member operatively engaged with a piston and a means for linearly advancing the piston into contact with a brake pad responsive to the rotation of the screw member. Other aspects of the invention provide a brake apparatus including a means for activating a motor to engage a transmission and a means for activating the transmission to rotate the screw member.

The foregoing and other features and advantages of the invention will become further apparent from the following detailed description of the presently preferred Embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
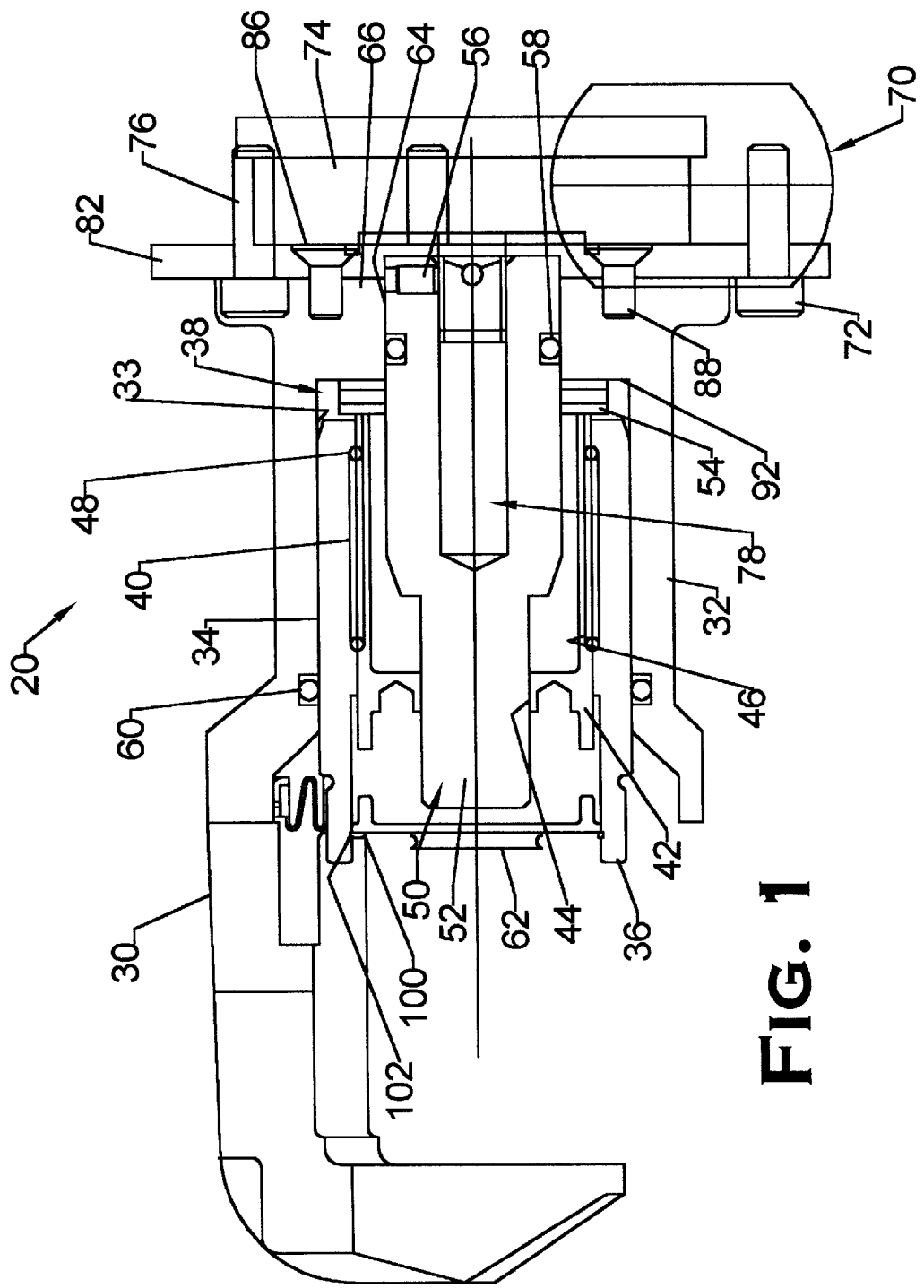
FIG. 1 illustrates a cross-sectional view of one embodiment of a brake assembly in accordance with the present invention.

Referring to FIG. 1, one embodiment of an exemplary brake assembly 20 is shown for use as a normal hydraulic service brake during vehicle operation including an electric brake feature or assembly for use during parking and emergency situations.

In the embodiment shown, the brake assembly 20 may include a brake caliper 30, a caliper housing 32, a transmission 74 and a motor 70. The caliper housing 32 may be suitably connected to a plate 82 with fasteners 86 and 88. Fasteners 86 and 88 may be flat screws. A transmission 74, which may be a non-backdrivable transmission, can be connected to plate 82 by fastener 76. Fastener 76 may be a cap screw. The motor 70 may be connected to the plate 82 by fastener 72. Fastener 72 may be a cap screw. In an alternative embodiment of the present invention, the plate structure can be an integral portion of the caliper housing to which the transmission and motor are operably connected.

Brake caliper 30 can be slidably connected to the caliper housing 32 in a known manner. The caliper housing 32 can include a central bore 33. A ball screw assembly 34, can be slidably positioned within the bore 33 of the caliper housing 32 so that a hydraulic fluid chamber 38 is defined.

The ball screw assembly 34 can include a screw member 42 and a piston 36, which can be hollow, defining the nut portion of the ball screw assembly 34. The hollow piston 36 may have, for example, a cylindrical shape. In one embodiment, the hollow piston 36 may include a grooved inside wall portion 40. The screw member 42 can be generally H-shaped having an axial opening 44 and a grooved outer wall portion 46. The grooved inner wall portion 40 of hollow piston 36 can be positioned adjacent to or along the grooved outer wall portion 46 of screw member 42 to form, in one embodiment, a ball race, including ball bearings 48.

Ball screw assembly 34 may have an anti-rotation feature (not shown) that prevents rotation of the hollow piston 36 thereby allowing the hollow piston 36 to maintain a linear motion. In one embodiment the anti-rotation feature may be positioned between the hollow piston 36 and brake pad (not shown) and may comprise an anti-rotation clip attached to the back of the brake pad which fits into an axial groove in the hollow piston.

Figure 2:
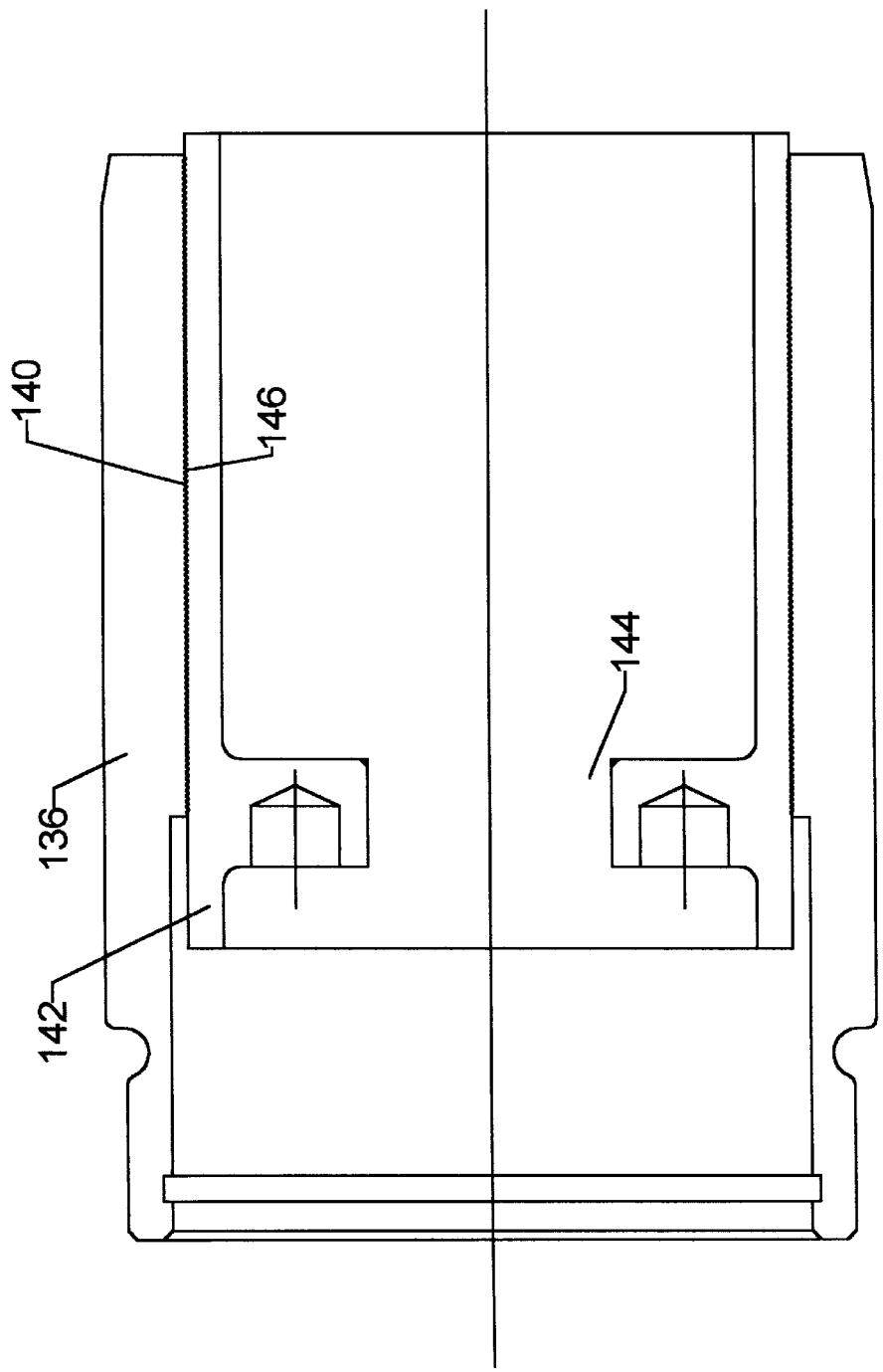
FIG. 2 illustrates a cross-sectional view of another embodiment of a brake assembly in accordance with the present invention.

In a second embodiment, illustrated in FIG. 2, there can be a threaded engagement between hollow piston 136 and screw member 142. In one embodiment, the inner wall 140 of hollow piston 136 can be threaded and the outer wall 146 of the screw member 142 can be similarly threaded and engaged with the inner wall threads so that the threads cooperate in such a manner that the rotation of the screw member 142 linearly moves the hollow piston 136. An axial opening of the screw member 142 is shown at 144.

Returning to FIG. 1, a driving member 50 can be positioned centrally within the caliper housing 32. The driving member 50 can be positioned within the caliper housing 32 through an axial opening 64 in the closed end 66 of the caliper housing 32 and through an axial opening (not shown) of plate 82. Driving member 50 may include a driving extension or extending portion 52 that extends through the axial opening 44 of screw member 42. In one embodiment, the driving portion 52 may have a square cross-section. Alternatively, the driving portion may have a non-square cross-section such as, for example, a rectangular, oval, or splined configuration with a corresponding complimentary axial opening of screw member 42.

The driving member 50 can include a central bore 78 opposite the driving portion 52. A drive shaft (not shown) of transmission 74 can be inserted into the central bore 78 of driving member 50 and can be suitably connected to driving member 50 by fastener 56. Fastener 56 can be a setscrew.

A bearing 54 with an axial opening can be positioned adjacent to the inside wall 92 of the closed end 66 of caliper housing 32 so that the axial opening of the bearing 54 corresponds with the axial opening 64 of the closed end 66 of the caliper housing 32 and through which the driving member 50 can be inserted. The bearing 54 may be a thrust needle bearing. The invention contemplates any sort of suitable arrangement of bushings and/or bearings that reduces the friction between the screw member and the inside wall of the caliper housing.

A first seal 58 can be positioned between the driving member 50 and the caliper housing 32. The first seal 58 may be an O-ring made of suitable material such as rubber. This first seal may be positioned to prevent the loss of hydraulic fluid from the fluid chamber between the driving member and the caliper housing.

A second seal 60 can be positioned between the caliper housing 32 and the hollow piston 36. The second seal 60 may be an O-ring made of suitable material such as rubber. The second seal 60 may be positioned to prevent the loss of hydraulic fluid from the fluid chamber between the hollow piston and the caliper housing.

A third seal 62 can be positioned within the hollow piston 36 to prevent the loss of hydraulic fluid from the fluid chamber between the hollow piston and the screw member. The third seal can be held in place within the hollow piston using a ring 100. The ring 100 may be a snap ring fitted within a groove 102 cut into the inner wall 40 of hollow piston 36. In one embodiment, the third seal may be a seal disc composed of a tool steel to suit.

In operation of the hydraulic brake during normal driving conditions, the vehicle operator actuates the brake system in a known manner resulting in an increase of hydraulic fluid pressure in one or more brake lines leading to the assembly 20. The increase in pressure of the hydraulic fluid in the brake line results in an increase of fluid in the fluid chamber 38 of the brake assembly 20. The increase of hydraulic fluid in the fluid chamber 38 can cause the ball screw assembly 34 and piston 36 to move linearly (laterally in FIG. 1) within the caliper housing 32. The lateral movement of the ball screw assembly 34 causes the hollow piston 36 portion of the ball screw assembly 34 to engage a rotor (not shown) in a known manner to slow the vehicle. Conversely, the release of the brake pedal by the vehicle operator decreases the hydraulic fluid pressure within the fluid chamber 38 resulting in release of an associated rotor, allowing the rotor to move.

In operation of the electric park brake portion of the brake assembly 20, the vehicle operator can engage the park brake (not shown) by some suitable means such as by a switch, lever, button or remote control. Alternatively, a control device, such as an electronic brake control module or computer of the vehicle can engage the park brake automatically when the vehicle is turned off or put into park. The electric motor 70 is activated, rotating the transmission 74 to rotate a transmission drive shaft or the like (not shown) that can be connected to the driving member 50. It will be understood that transmission 74 can be any suitable device for transmitting output from the motor 70, such as, for example, a set of meshed gears, chains and sprockets, pulleys and belts and the like. The rotation of the transmission 74 can rotate the driving member 50. The rotation of the driving member 50 can result in the rotation of screw member 42 of the ball screw assembly 34. The ball groove connection between the screw member 42 and the hollow piston 36 translates the rotational movement of the screw member 42 into linear movement of the hollow piston 36. The linear movement of the hollow piston 36 causes the hollow piston to move associated brake pads to engage a rotor in a similar manner as that via the hydraulic brake system described above. The brake pads remain held against the rotor until such time when the non-backdriveable transmission is reversed by the motor.

As described above, the assembly 20 provides a number of advantages, some of which have been described above and others of which are inherent in the invention. Also modifications may be proposed without departing from the teachings herein. Accordingly the scope of the invention is only to be limited as necessitated by the accompanying claims.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A brake apparatus comprising:

a housing including a bore formed therein;

a piston slidably positioned in the bore, the piston and bore defining a fluid chamber therebetween; and a screw member operably engaged with the piston, wherein the piston and screw member are movable based on fluid pressure in the fluid chamber and wherein the piston is movable in a linear direction based on the rotational movement of the screw member.

2. The brake apparatus of claim 1 further comprising:

a driving member positioned in the bore and operatively engaged with the screw member.

3. The brake apparatus of claim 2 further comprising:

a motor operatively engaged with the driving member.

4. The brake apparatus of claim 2 further comprising:

a transmission operatively engaged with the driving member; and a motor operatively connected to the transmission.

5. The brake apparatus of claim 1 wherein the screw member includes a first helically shaped groove formed into an outer surface of the screw member, and the piston includes a second helically shaped groove formed into an inner surface of the piston, the first and second grooves positioned to engage a plurality of rolling elements disposed therebetween.

6. The brake apparatus of claim 1 wherein the screw member includes a first threaded portion on an outer surface thereof, and the piston includes a second threaded portion on an inner surface thereof, the first and second threaded portions being threadably engaged.

7. The brake apparatus of claim 2 wherein the driving member includes an extending portion operatively connected to the screw member.

8. The brake apparatus of claim 2 further comprising:

a first seal disposed between the housing and the driving member;

a second seal disposed between the housing and the piston; and a third seal disposed within the piston.

9. The brake apparatus of claim 4 further comprising:

a first seal disposed between the housing and the driving member;

a second seal disposed between the housing and the piston; and a third seal disposed within the piston, wherein the screw member includes a first helically shaped groove formed into an outer surface of the screw member, and the piston includes a second helically shaped groove formed into an inner surface of the piston, the first and second grooves positioned to engage a plurality of rolling elements disposed therebetween, the driving member including a driving portion operatively connected to the screw member.

10. A method of applying an electric park brake for a hydraulic apply brake system comprising:

rotating a screw member engaged with a piston; and linearly advancing the piston into contact with a brake pad responsive to the rotation of the screw member, wherein the screw member includes a first helically, shaped groove formed into an outer surface of the screw member, and the piston includes a second helically shaped groove formed into an inner surface of the piston, the first and second grooves positioned to engage a plurality of rolling elements disposed there between.

11. The method of claim 10 further comprising: activating a motor to rotate the screw member.

12. The method of claim 10 further comprising:

activating a motor to engage a transmission; and activating the transmission to rotate the screw member.

13. A brake apparatus comprising:

means for rotating a screw member operatively engaged with a piston; and means for linearly advancing the piston into contact with a brake pad responsive to the rotation of the screw member, wherein the screw member includes a first helically shaped groove formed into an outer surface of the screw member, and the piston includes a second helically shaped groove formed into an inner surface of the piston, the first and second grooves positioned to engage a plurality of rolling elements disposed therebetween.

14. The brake apparatus of claim 13 further comprising:

means for activating a motor to engage a transmission; and means for activating the transmission to rotate the screw member.

* * * * *